United States Patent
Chawla et al.

(10) Patent No.: US 10,078,454 B2
(45) Date of Patent: Sep. 18, 2018

(54) ACCESS TO STORAGE RESOURCES USING A VIRTUAL STORAGE APPLIANCE

(71) Applicant: Dell Products L.P., Round Rock, TX (US)

(72) Inventors: Gaurav Chawla, Austin, TX (US); Michael Karl Molloy, Round Rock, TX (US); Robert Wayne Hormuth, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 136 days.

(21) Appl. No.: 15/183,107

(22) Filed: Jun. 15, 2016

(65) Prior Publication Data

US 2016/0299702 A1    Oct. 13, 2016

Related U.S. Application Data

(63) Continuation of application No. 13/902,482, filed on May 24, 2013, now Pat. No. 9,405,566.

(51) Int. Cl.

| | |
|---|---|
| *G06F 13/36* | (2006.01) |
| *G06F 9/455* | (2018.01) |
| *G06F 3/06* | (2006.01) |
| *G06F 21/00* | (2013.01) |
| *G06F 13/28* | (2006.01) |
| *G06F 13/42* | (2006.01) |

(52) U.S. Cl.
CPC .......... *G06F 3/0611* (2013.01); *G06F 3/0665* (2013.01); *G06F 3/0685* (2013.01); *G06F 9/45533* (2013.01); *G06F 9/45558* (2013.01); *G06F 13/28* (2013.01); *G06F 13/36* (2013.01); *G06F 13/4282* (2013.01); *G06F 21/00* (2013.01); *G06F 2009/45579* (2013.01)

(58) Field of Classification Search
CPC .............. G06F 3/30661; G06F 3/0665; G06F 2009/45579; G06F 9/45533; G06F 9/45558; G06F 13/36; G06F 21/00; G06F 2213/0026

See application file for complete search history.

(56) References Cited

U.S. PATENT DOCUMENTS

| | | | |
|---|---|---|---|
| 8,489,699 B2 | 7/2013 | Goggin et al. | 709/213 |
| 8,572,428 B2 | 10/2013 | Nishita et al. | 714/6.1 |

(Continued)

OTHER PUBLICATIONS

"Non-Transparent Bridging Makes PCI-Express HA Friendly," by Akber Kazmi, PLX Technology, eetimes.com/General/PrintView/4139182, dated Aug. 14, 2003, 6 pages.

*Primary Examiner* — Glenn Allen Auve
(74) *Attorney, Agent, or Firm* — Baker Botts L.L.P.

(57) ABSTRACT

Methods and systems for improved access to storage resources include installing a virtual storage appliance as a virtual machine on a hypervisor. The virtual storage appliance installs itself as a virtual PCI-E device and communicates with guest operating systems of the hypervisor using direct memory access via a PCI-E non-transparent bridge. The storage virtual appliance provides access to local and external storage resources with very high performance to applications running under the guest operating system, thereby overcoming performance barriers associated with native hypervisor driver models.

20 Claims, 4 Drawing Sheets

(56) References Cited

U.S. PATENT DOCUMENTS

| | | |
|---|---|---|
| 8,719,817 B2 | 5/2014 | Aswani et al. .................. 718/1 |
| 8,880,768 B2 | 11/2014 | Mathew et al. .............. 710/308 |
| 9,405,566 B2 * | 8/2016 | Chawla ............... G06F 9/45533 |
| 2007/0174850 A1 | 7/2007 | El Zur .......................... 719/321 |
| 2010/0332756 A1 | 12/2010 | Yarch et al. .................. 711/119 |
| 2011/0167189 A1 | 7/2011 | Matsubara et al. ........... 710/308 |
| 2011/0231369 A1 | 9/2011 | Kawamura et al. ........... 707/659 |
| 2011/0238909 A1 | 9/2011 | Kumar et al. ................. 711/114 |
| 2012/0166699 A1 | 6/2012 | Kumar et al. ................. 710/306 |
| 2012/0272241 A1 | 10/2012 | Nonaka et al. .................. 718/1 |

* cited by examiner

ACCESS TO STORAGE RESOURCES USING A VIRTUAL STORAGE APPLIANCE

CROSS REFERENCE TO RELATED APPLICATIONS

This application is a continuation application of U.S. patent application Ser. No. 13/902,482 filed May 24, 2013, which is incorporated herein by reference in its entirety for all purposes.

BACKGROUND

Field of the Disclosure

This disclosure relates generally to virtualized information handling systems and more particularly to a system and method for improved access to storage resources using a virtual storage appliance.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine".

Often, virtualized architectures may be employed for numerous reasons, e.g., (1) increased hardware resource utilization; (2) cost-effective scalability across a common, standards-based infrastructure; (3) workload portability across multiple servers; (4) streamlining of application development by certifying to a common virtual interface rather than multiple implementations of physical hardware; and/or (5) encapsulation of complex configurations into a file that is easily replicated and provisioned, among other reasons. As noted above, the information handling system may include one or more operating systems, for example, executing as guest operating systems in respective virtual machines.

An operating system serves many functions, such as controlling access to hardware resources and controlling the execution of application software. Operating systems also provide resources and services to support application software. These resources and services may include data storage, support for at least one file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

The information handling system may include multiple processors connected to various devices, such as Peripheral Component Interconnect ("PCI") devices and PCI express ("PCI-E") devices. The operating system may include one or more drivers configured to facilitate the use of the devices. As mentioned previously, the information handling system may also run one or more virtual machines, each of which may instantiate a guest operating system. Virtual machines may be managed by a virtual machine manager, such as, for example, a hypervisor. Certain virtual machines may be configured for device passthrough, such that the virtual machine may utilize a physical device directly without requiring the intermediate use of operating system drivers.

Current information handling systems may benefit from increased performance of virtual machines as their utilization increases. Improved performance may also benefit systems where multiple virtual machines operate concurrently. Applications executing under a guest OS in a virtual machine may also have a need for higher performance from certain computing resources, such as storage resources.

SUMMARY

In one aspect, a disclosed method executed by at least one processor includes loading a storage virtual appliance as a virtual machine on a hypervisor, wherein the storage virtual appliance is accessed by the hypervisor using a Peripheral Component Interconnect Express (PCI-E) device driver that supports direct memory access (DMA). The method may include enabling, using the storage virtual appliance, a guest operating system executing on the hypervisor access to storage resources, wherein the storage virtual appliance communicates with the guest operating system via direct memory access over a PCI-E non-transparent bridge Other disclosed aspects include article of manufacture comprising a non-transitory computer-readable medium storing instructions executable by a processor subsystem, and an information handling system comprising a processor subsystem having access to a memory subsystem storing instructions executable by the processor subsystem.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
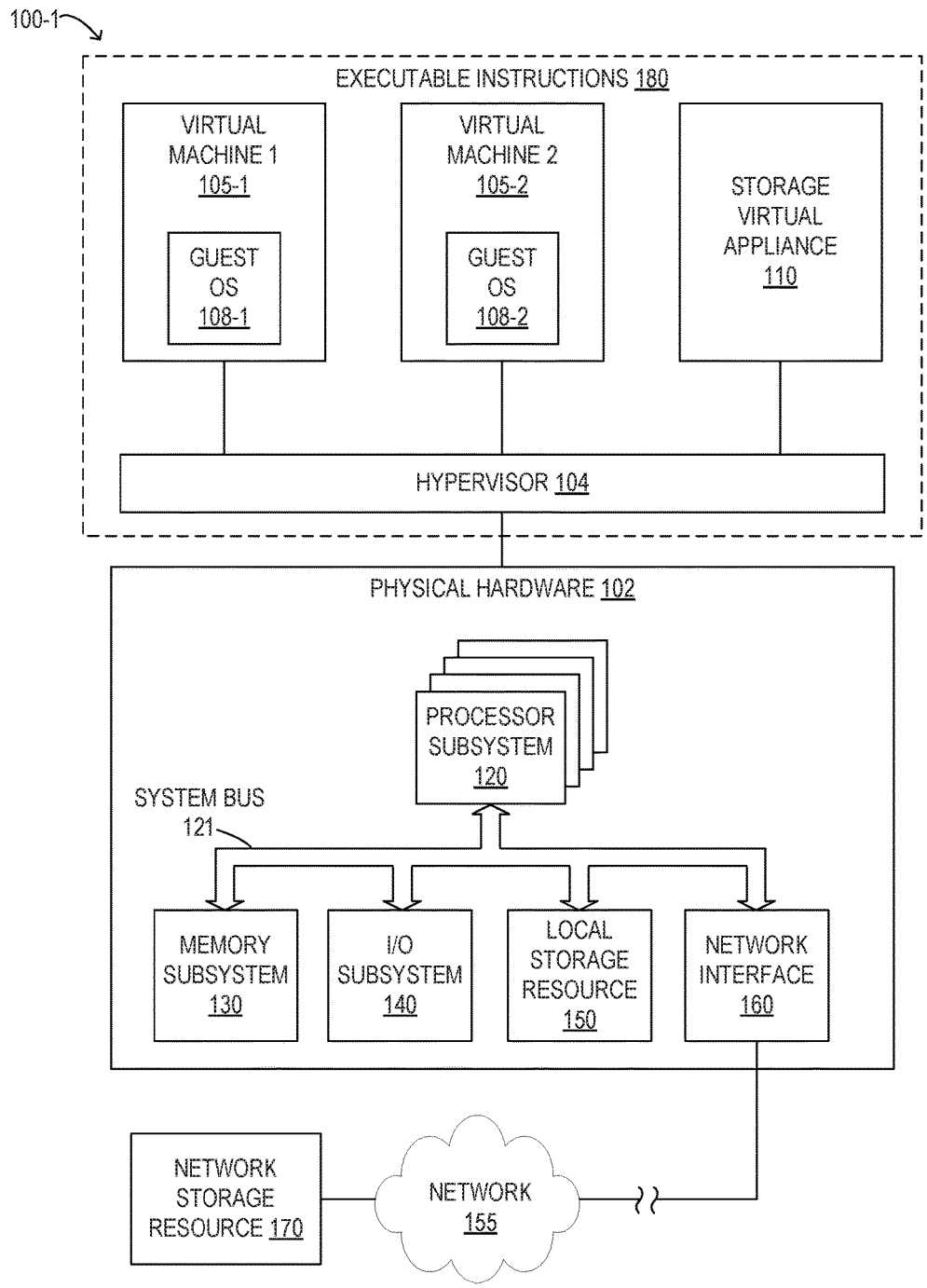
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

As noted previously, current virtual information handling systems may demand higher performance from computing resources, such as storage resources used by applications executing under guest operating systems. Many virtualized server platforms may desire to provide storage resources to such applications in the form of software executing on the same server where the applications are executing, which may offer certain advantages by bringing data closest to the application. Such software-defined storage may further enable new technologies, such as, but not limited to: (1) flash caches and cache networks using solid state devices (SSD) to cache storage operations and data; (2) virtual storage area networks (SAN); and (3) data tiering by storing data across local storage resources, SAN storage, and network storage, depending on I/O load and access patterns. Server virtualization has been a key enabler of software-defined storage by enabling multiple workloads to run on a single physical machine. Such workloads also benefit by provisioning storage resources closest to the application accessing data stored on the storage resources.

Storage software providing such functionality may interact with multiple lower level device drivers. For example: a layer on top of storage device drivers may provide access to server resident hard drives, flash SSD drives, non-volatile memory devices, and/or SAN storage using various types of interconnect fabric, (i.e., iSCSI, Fibre Channel, Fibre Channel over Ethernet, etc.). In another example, a layer on top of network drivers may provide access to storage software running on other server instances (i.e., access to a cloud). Such driver-based implementations have been challenging from the perspective of supporting multiple hypervisors and delivering adequate performance. Certain hypervisors in use today may not support third-party development of drivers, which may preclude an architecture based on optimized filter drivers in the hypervisor kernel. Other hypervisors may have different I/O architectures and device driver models, which may present challenges to developing a unified storage software for various hypervisor platforms.

Another solution is to implement the storage software as a virtual machine with passthrough access to physical storage devices and resources. However, such a solution may face serious performance issues when communicating with applications executing on neighboring virtual machines, due to low data throughput and high latency in the hypervisor driver stack. Thus, even though the underlying storage resources may deliver substantially improved performance, such as flash caches and cache networks, the performance advantages may not be experienced by applications in the guest OS using typical hypervisor driver stacks.

As will be described in further detail, the inventors of the present disclosure have developed novel methods and systems disclosed herein for improving access to storage resources by using a storage virtual appliance that provides managed access to local and remote storage resources, while utilizing direct memory access (DMA) for storage operations to and from a guest OS in a virtual information handling system. Direct memory access involves the transfer of data to/from system memory without significant involvement by a processor subsystem, thereby improving data throughput and reducing a workload of the processor subsystem.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. For example, the hypervisor and/or the error detection system, both described more fully below, may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2, 3, and 4 wherein like numbers are used to indicate like and corresponding parts.

Turning now to the drawings, FIG. 1 illustrates a block diagram depicting selected elements of an embodiment of system 100-1 for improving access to storage resources using a storage virtual appliance, in accordance with the present disclosure. As depicted in FIG. 1, system 100-1 may represent an information handling system comprising physical hardware 102, executable instructions 180 (including hypervisor 104, one or more virtual machines 105, and storage virtual appliance 110). Also shown with system 100-1 are external or remote elements, namely, network 155 and network storage resource 170.

As shown in FIG. 1, components of physical hardware 102 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100-1 and a network 155. Network interface 160 may enable information handling system 100-1 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of physical hardware 102). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100-1, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100-1, I/O subsystem 140 may comprise a system, device, or apparatus generally operable to receive and/or transmit data to/from/within system 100-1. I/O subsystem 140 may represent, for example, a variety of communication interfaces, graphics interfaces, video interfaces, user input interfaces, and/or peripheral interfaces.

In FIG. 1, hypervisor 104 may comprise software and/or firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including, but not limited to, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In one embodiment, hypervisor 104 may comprise a specially designed operating system (OS) with native virtualization capabilities. In another embodiment, hypervisor 104 may comprise a standard OS with an incorporated virtualization component for performing virtualization. In another embodiment, hypervisor 104 may comprise a standard OS running alongside a separate virtualization application. In this embodiment, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, and/or as firmware running on physical hardware 102), also referred to as device passthrough, such that the virtual machine may utilize a physical device directly without requiring the intermediate use of operating system drivers. As a further alternative, the virtualization application of hypervisor 104 may, on various levels, interact directly with physical hardware 102 (e.g., similar to the way the OS interacts directly with physical hardware 102, and/or as firmware running on physical hardware 102) without utilizing the OS, although still interacting with the OS to coordinate use of physical hardware 102.

As shown in FIG. 1, virtual machine 1 105-1 may represent a host for guest OS 108-1, while virtual machine 2 105-2 may represent a host for guest OS 108-2. To allow multiple operating systems to be executed on system 100-1 at the same time, hypervisor 104 may virtualize certain hardware resources of physical hardware 102 and present virtualized computer hardware representations to each of virtual machines 105. In other words, hypervisor 104 may assign to each of virtual machines 105, for example, one or more processors from processor subsystem 120, one or more regions of memory in memory subsystem 130, one or more components of I/O subsystem 140, etc. The virtualized hardware representation presented to each of virtual machines 105 may comprise a mutually exclusive, or non-overlapping, set of hardware resources per virtual machine 105 (e.g., no hardware resources may be shared between virtual machines 105) or may comprise an overlapping set of hardware resources per virtual machine 105 (e.g., one or more hardware resources may be shared by two or more virtual machines 105).

In one embodiment, hypervisor 104 may assign hardware resources of physical hardware 102 statically (i.e., certain hardware resources are assigned to certain virtual machines, and this assignment does not vary over time). Additionally or alternatively, hypervisor 104 may assign hardware resources of physical hardware 102 dynamically (i.e., the assignment of hardware resources to virtual machines varies over time, for example, in accordance with the specific needs of the applications running on the individual virtual machines). Additionally or alternatively, hypervisor 104 may keep track of the hardware-resource-to-virtual-machine mapping, such that hypervisor 104 is able to determine the virtual machines to which a given hardware resource of physical hardware 102 has been assigned.

In FIG. 1, Each of virtual machines 105 may respectively include guest operating system (guest OS) 108, along with any applications or other software (not shown) running on guest OS 108-110. Each guest OS 108-110 may represent an OS compatible with and/or supported by hypervisor 104 (even when guest OS is generally incompatible with physical hardware 102). In addition, each guest OS 108 may be a separate instance of the same operating system or an instance of three different operating systems. For example, in one embodiment, each guest OS 108 may comprise a LINUX OS. As another example, guest OS 108-1 may comprise a LINUX OS, guest OS 108-1 may comprise a MICROSOFT WINDOWS OS, and while another guest OS on another virtual machine (not shown) may comprise a VXWORKS OS. Although system 100-1 is depicted as having three virtual machines 108-1, 108-2, and storage virtual appliance 110, it will be understood that, in particular embodiments, different numbers of virtual machines may be executing on information handling system 100 at any given time.

In FIG. 1, storage virtual appliance 110 may represent storage software executing on hypervisor 104. Although storage virtual appliance 110 may be implemented as a virtual machine, and may execute in a similar environment and address space as described above with respect to virtual machines 105, storage virtual appliance 110 may be dedicated to providing access to storage resources to guest OS 108, and may not itself be a host for a guest OS. It will be understood that storage virtual appliance 110 may include an embedded virtualized OS (not shown) similar to various implementations of guest OS 108 described previously herein. In particular, storage virtual appliance 110 may enjoy passthrough device access to various devices and interfaces for accessing storage resources (local and/or remote) and may be enabled to provide logical communication connections between desired storage resources and guest OS 108 using direct memory access for very high data throughput rates and very low latency transfer operations, as described herein.

In operation of system 100 shown in FIG. 1, hypervisor 104 of information handling system 100 may virtualize the hardware resources of physical hardware 102 and present virtualized computer hardware representations to each of virtual machines 105. Each guest OS 108 of virtual machines 105 may then begin to operate and run applications and/or other software (not shown). While operating, each guest OS 108 may utilize one or more hardware resources of physical hardware 102 assigned to the respective virtual machine by hypervisor 104. Each guest OS 108 and/or application executing under guest OS 108 may be presented with storage resources that are managed by storage virtual appliance 110. In other words, storage virtual appliance 110 may be enabled to mount and partition various combinations of physical storage resources, including local storage resources and remote storage resources, and present these physical storage resources as desired logical storage devices for access by guest OS 108 (see also FIG. 2). In particular, storage virtual appliance 110 may be installed in hypervisor 104 as a virtual PCI-E device and may use a PCI-E non-transparent bridge (NTB) with direct memory access between two processors of processor subsystem 120 to transfer data between guest OS 108 and the storage resources provided by storage virtual appliance 110. In this manner, storage virtual appliance 110 may overcome performance limitations otherwise associated with access to guest OS 108 under hypervisor 104. Also, the features of storage virtual appliance 110 described herein may further allow for implementation in a manner that is independent, or largely independent, of any particular implementation of hypervisor 104.

Figure 2:
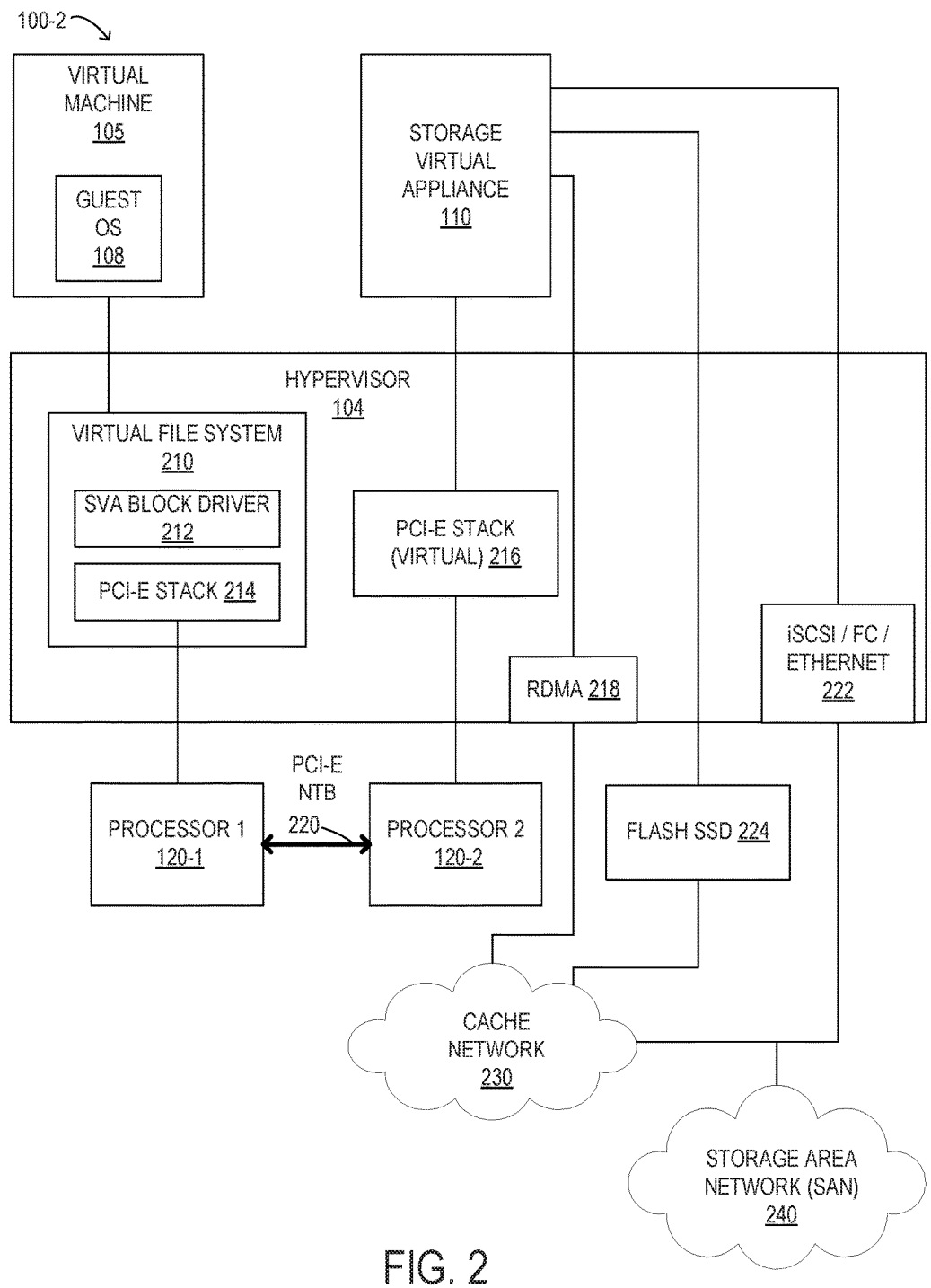
FIG. 2 is a block diagram of selected elements of an embodiment of an information handling system.

Turning now to FIG. 2, a block diagram of selected elements of an embodiment of system 100-2 is illustrated. In FIG. 2, system 100-2 may represent an information handling system that is an embodiment of system 100-1 (see FIG. 1). As shown, system 100-2 includes further details regarding the operation and use of storage virtual appliance 110, while other elements shown in system 100-1 have been omitted from FIG. 2 for descriptive clarity. In FIG. 2, for example, virtual machine 105 and guest OS 108 are shown in singular, though they may represent any number of instances of virtual machine 105 and guest OS 108.

In FIG. 2, virtual machine 105 is shown with access to virtual file system 210, which may be a file system provided by hypervisor 104, for example, for access by guest OS 108. As shown, virtual file system 210 may be equipped with SVA block driver 212 that is configured to access storage virtual appliance 110, as well as PCI-E stack 214 that enables virtual file system 210 to connect to PCI-E devices installed under hypervisor 104. Additionally, SVA block driver 212 may communicate with storage virtual appliance 110 using PCI-E non-transparent bridge (NTB) 220 using direct memory access (DMA). As noted previously, storage virtual appliance 110 may be installed under hypervisor 104 as a virtual PCI-E device, and may accordingly also use PCI-E stack (virtual) 216 to access PCI-E NTB 220. In particular embodiments, PCI-E stack 214 and PCI-E stack (virtual) 216 may represent standard PCI-E driver interfaces, such that from a perspective of hypervisor 104, storage virtual appliance 110 appears as a PCI-E device.

As shown in FIG. 2, PCI-E NTB 220 may represent a non-transparent bridge with a host on both sides of the bridge, shown as processor 1 120-1 and processor 2 120-2. Each host of PCI-E NTB 220 may have its own independent address domain, and may have visibility into a certain portion of the address domain of the other host. Each host may treat the other host as an endpoint of PCI-E NTB 220 and may map an address segment of the other host into its native memory space. In given embodiments, storage virtual appliance 110 may represent one port at an endpoint of PCI-E NTB 220, while SVA block driver 212 may represent another port at another endpoint of PCI-E NTB 220.

Additionally, in the exemplary embodiment of FIG. 2, storage virtual appliance 110 is shown with passthrough access to remote direct memory access (RDMA) 218, iSCSI/Fibre Channel (FC)/Ethernet 222, and/or flash SSD 224. For example, RDMA 218 and/or flash SSD 224 and/or iSCSI/FC/Ethernet 222 may participate in cache network 230, which may be a high performance network for caching storage operations and/or data between a plurality of information handling systems (not shown), such as system 100. As shown, iSCSI/FC/Ethernet 222 may also provide access to storage area network (SAN) 240, which may include various external storage resources, such as network-accessible storage arrays.

Figure 3:
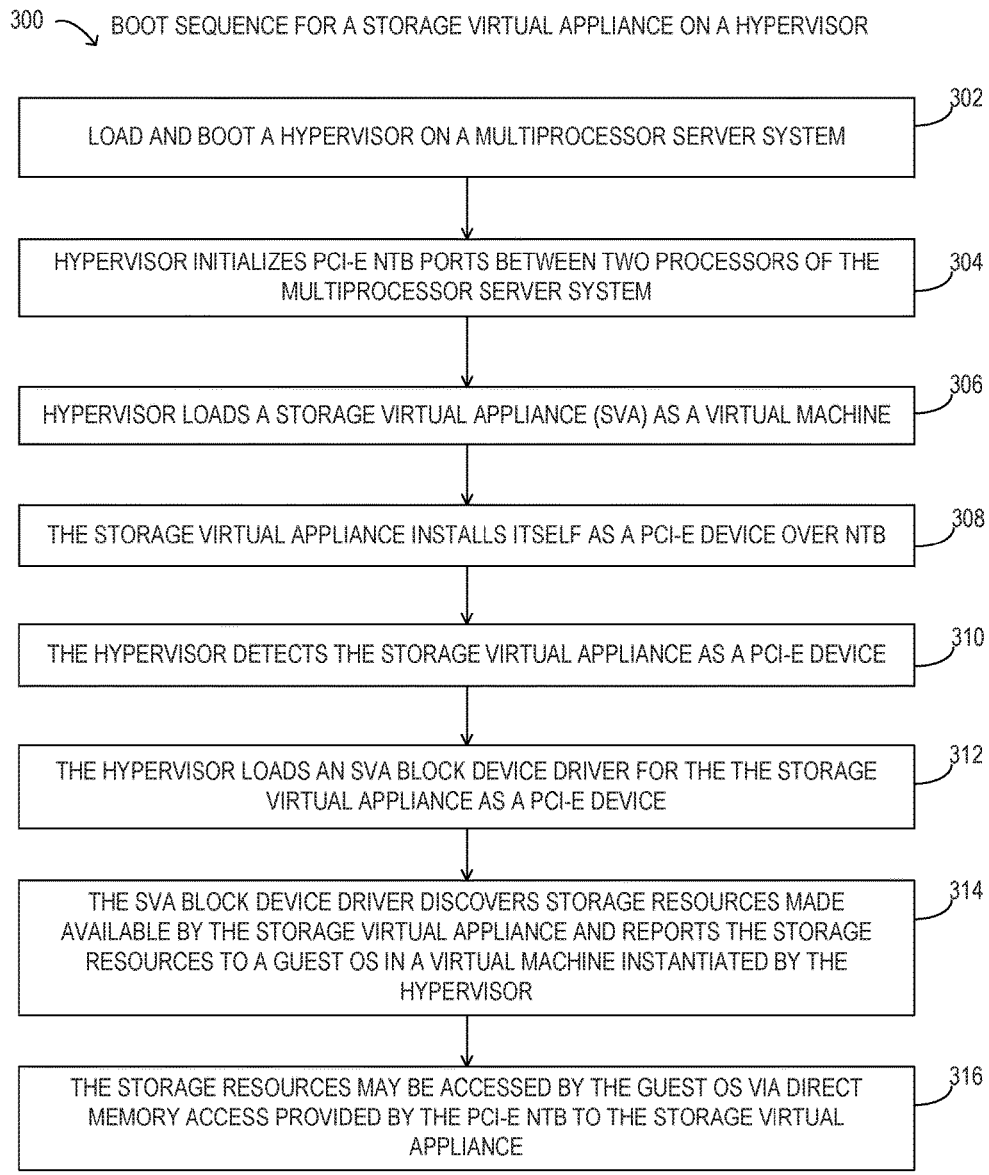
FIG. 3 is flowchart depicting selected elements of an embodiment of a method for improved access to storage resources using a storage virtual appliance.

Referring now to FIG. 3, a block diagram of selected elements of an embodiment of method 300 for a boot sequence for a storage virtual appliance on a hypervisor is depicted in flowchart form. Method 300 may be performed using system 100 (see FIGS. 1 and 2) for example, by using hypervisor 104 and storage virtual appliance 110. It is noted that certain operations described in method 300 may be optional or may be rearranged in different embodiments.

In FIG. 3, method 300 may begin by loading and booting (operation 302) a hypervisor on a multiprocessor server system. The hypervisor may initialize (operation 304) PCI-E NTB ports between two processors of the multiprocessor server system. The hypervisor may load (operation 306) a storage virtual appliance (SVA) as a virtual machine. The storage virtual appliance (operation 308) may install itself as a PCI-E device over NTB. The hypervisor may detect (operation 310) the storage virtual appliance as a PCI-E device. Thy hypervisor may then load (operation 312) an SVA block device driver for the storage virtual appliance as a PCI-E device. The storage virtual appliance may be loaded as a virtual PCI-E device in a system address space of the hypervisor. The SVA block device driver may be accessed by a virtual file system of the hypervisor. The SVA block device driver may discover (operation 312) storage resources made available by the storage virtual appliance and may report (operation 312) the storage resources to a guest OS in a virtual machine instantiated by the hypervisor. In given embodiments, the storage resources may be reported as one or more logical drives to the guest OS, which, in turn, may provide access to the logical drives to applications executing under the guest OS. The storage resources may be accessed (operation 316) by the guest OS via direct memory access provided by the PCI-E NTB to the storage virtual appliance Referring now to FIG. 4, a block diagram of selected elements of an embodiment of method 400 for operation of a storage virtual appliance executing on a hypervisor is depicted in flowchart form. Method 400 may be performed using system 100 (see FIGS. 1 and 2) for example, by using hypervisor 104 and storage virtual appliance 110. It is noted that certain operations described in method 400 may be optional or may be rearranged in different embodiments.

Figure 4:
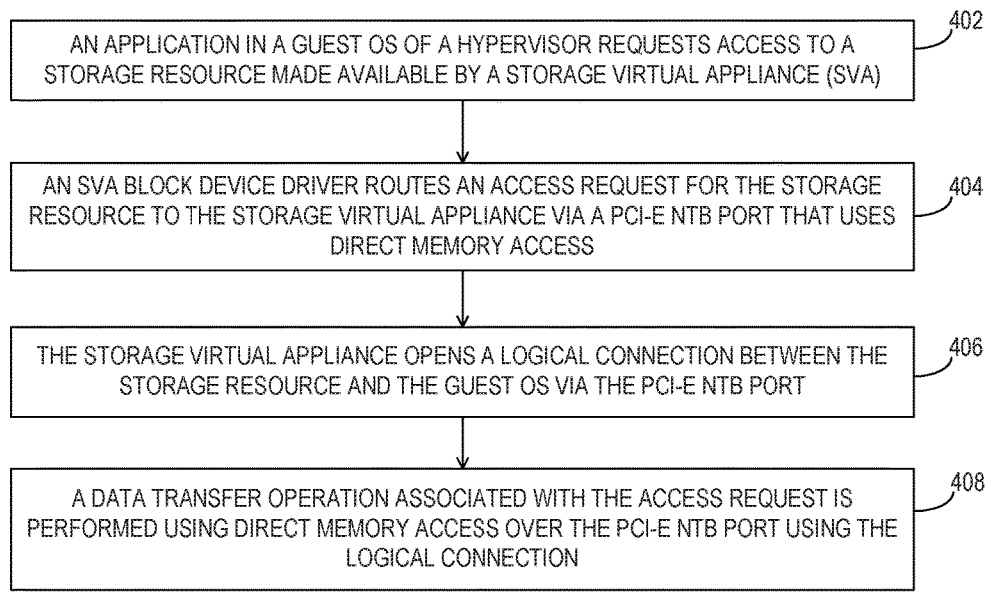
FIG. 4 is flowchart depicting selected elements of an embodiment of a method for improved access to storage resources using a storage virtual appliance.

In FIG. 4, method 400 may begin by an application in a guest OS of a hypervisor requesting (operation 402) access to a storage resource made available by a storage virtual appliance (SVA). The storage virtual appliance may be installed on the hypervisor according to method 300 (see FIG. 3). An SVA block device driver may route (operation 404) an access request for the storage resource to the storage virtual appliance via a PCI-E NTB port that uses direct memory access. The storage virtual appliance may open (operation 406) a logical connection between the storage resource and the guest OS via the PCI-E NTB port. The logical connection may be to access a particular volume, directory, file, file system, and/or partition associated with the storage resource. Then, a data transfer operation associated with the access request may be performed (operation 408) using direct memory access over the PCI-E NTB port using the logical connection.

As described in detail above, disclosed methods and systems for improved access to storage resources include installing a virtual storage appliance as a virtual machine on a hypervisor. The virtual storage appliance installs itself as a virtual PCI-E device and communicates with guest operating systems of the hypervisor using direct memory access provided by a PCI-E non-transparent bridge (NTB). The storage virtual appliance provides access to local and external storage resources with very high performance to applications running under the guest operating system, thereby overcoming performance barriers associated with native hypervisor driver models.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method executed by at least one processor comprising:
   requesting access to storage resources by an application executing on an operating system;
   routing the request for access to a storage virtual appliance using a storage virtual appliance block device driver;

opening a logical connection between the storage resources and the operating system using a Peripheral Component Interconnect Express (PCI-E) non-transparent bridge (NTB); and enabling data to be transferred between the operating system and the storage resources using direct memory access (DMA) over the logical connection, wherein the storage virtual appliance has access to a first port of the PCI-E non-transparent bridge and the storage virtual appliance block device driver has access to a second port of the PCI-E non-transparent bridge.

2. The method of claim 1, wherein the storage virtual appliance is a virtual PCI-E device in a system address space of a hypervisor.

3. The method of claim 1, wherein the operating system executes on a multiprocessor system, and wherein the PCI-E non-transparent bridge spans across at least two processors in the multiprocessor system.

4. The method of claim 1, further comprising:
discovering, at the storage virtual appliance block device driver, the storage resources enabled for access by the storage virtual appliance, and
reporting the storage resources to the operating system.

5. The method of claim 1, wherein the step of requesting access to storage resources further comprises a plurality of operating systems executing as respective virtual machines under a hypervisor requesting access to storage resources, and the step of enabling data to be transferred further comprises enabling data to be transferred between the plurality of operating systems and the storage resources.

6. The method of claim 1, wherein the storage resources comprise at least one of:
a cache network shared among a plurality of multiprocessor servers;
a storage area network;
a flash memory solid state device; and
an array of storage devices.

7. An article of manufacture comprising a non-transitory computer-readable medium storing instructions, that, when executed by a processor subsystem, cause the processor subsystem to:
request access to storage resources using an application on an operating system;
route the request for access to a storage virtual appliance using a storage virtual appliance block device driver;
open a logical connection between the storage resources and the operating system using a Peripheral Component Interconnect Express (PCI-E) non-transparent bridge (NTB); and
enable data to be transferred between the operating system and the storage resources using direct memory access (DMA) over the logical connection, wherein the storage virtual appliance has access to a first port of the PCI-E non-transparent bridge and the storage virtual appliance block device driver has access to a second port of the PCI-E non-transparent bridge.

8. The article of manufacture in claim 7, wherein the storage virtual appliance is a virtual PCI-E device in a system address space of a hypervisor.

9. The article of manufacture in claim 7, wherein the operating system executes on a plurality of processors and the PCI-E non-transparent bridge spans across at least two processors in the plurality of processors.

10. The article of manufacture in claim 7, wherein the non-transitory computer-readable medium further stores instructions that cause the processor subsystem to:
discover, at the storage virtual appliance device driver, the storage resources enabled for access by the storage virtual appliance; and
report the storage resources to the operating system.

11. The article of manufacture in claim 7, wherein the instructions that cause the processor subsystem to request access to storage resources further causes the processor subsystem to request access to the storage resources for a plurality of operating systems executing as respective virtual machines under a hypervisor, and wherein the instructions that cause the processor subsystem to enable data to be transferred further causes the processor subsystem to enable data to be transferred between the plurality of operating systems and the storage resources.

12. The article of manufacture in claim 7, wherein the storage resources comprise at least one of:
a cache network shared among a plurality of multiprocessor servers;
a storage area network;
a flash memory solid state device (SSD); and
an array of storage devices.

13. The article of manufacture in claim 7, wherein the storage resources comprise a cache network shared among a plurality of multiprocessor servers, wherein the cache network is accessed using at least one of:
a flash memory solid state device (SSD);
remote direct memory access (RDMA);
an internet small computer system interface (iSCSI);
a fibre channel (FC); and
an ethernet.

14. An information handling system comprising:
a processor subsystem having access to a memory subsystem, wherein the memory subsystem stores instructions executable by the processor subsystem, that, when executed by the processor subsystem, cause the processor subsystem to:
request access to storage resources using an application on an operating system;
route the request for access to a storage virtual appliance using a storage virtual appliance block device driver;
open a logical connection between the storage resources and the operating system using a Peripheral Component Interconnect Express (PCI-E) non-transparent bridge (NTB); and
enable data to be transferred between the operating system and the storage resources using direct memory access (DMA) over the logical connection, wherein the storage virtual appliance has access to a first port of the PCI-E non-transparent bridge and the storage virtual appliance block device driver has access to a second port of the PCI-E non-transparent bridge.

15. The information handling system of claim 14, wherein the storage virtual appliance is a virtual PCI-E device in a system address space of a hypervisor.

16. The information handling system of claim 14, wherein the operating system executes on a plurality of processors and the PCI-E non-transparent bridge spans across at least two processors in the plurality of processors.

17. The information handling system of claim 14, wherein the memory subsystem further stores instructions that cause the processor subsystem to:
discover, at the storage virtual appliance device driver, the storage resources enabled for access by the storage virtual appliance; and
report the storage resources to the operating system.

18. The information handling system of claim 14, wherein the instructions that cause the processor subsystem to request access to storage resources further causes the processor subsystem to request access to the storage resources for a plurality of operating systems executing as respective virtual machines under a hypervisor, and wherein the instructions that cause the processor subsystem to enable data to be transferred further causes the processor subsystem to enable data to be transferred between the plurality of operating systems and the storage resources.

19. The information handling system of claim 14, wherein the storage resources comprise at least one of:
   a cache network shared among a plurality of multiprocessor servers;
   a storage area network;
   a flash memory solid state device (SSD); and
   an array of storage devices.

20. The information handling system of claim 14, wherein the storage resources comprise a cache network shared among a plurality of multiprocessor servers, wherein the cache network is accessed using at least one of:
   a flash memory solid state device (SSD);
   remote direct memory access (RDMA);
   an internet small computer system interface (iSCSI);
   a fibre channel (FC); and
   an ethernet.

* * * * *